United States Patent

Burris et al.

Patent Number: 6,039,884
Date of Patent: Mar. 21, 2000

[54] REVERSIBLE FLOW CIRCUIT FOR BATCH LIQUID PURIFIER

[75] Inventors: William Alan Burris, Pittsford; Philip M. Prinsen, Ontario, both of N.Y.

[73] Assignee: Alab, LLC, Pittsford, N.Y.

[21] Appl. No.: 09/034,710

[22] Filed: Mar. 4, 1998

[51] Int. Cl.[7] .............................. B01D 11/04; C02F 1/78
[52] U.S. Cl. ...................... 210/760; 210/136; 210/138; 210/143; 210/192; 210/202; 422/116; 422/186.07; 422/186.1; 422/305; 422/250
[58] Field of Search .......................... 210/136, 138–143, 210/194, 192, 201, 202, 205–208, 220, 739–746, 760, 765; 422/28, 116, 119, 255, 250, 292, 305, 186.07, 186.08, 186.1

[56] References Cited

U.S. PATENT DOCUMENTS

| | | |
|---|---|---|
| 3,823,728 | 7/1974 | Burris ........................................ 210/760 |
| 5,075,016 | 12/1991 | Barnes ....................................... 210/760 |
| 5,207,993 | 5/1993 | Burris ........................................ 422/250 |
| 5,474,749 | 12/1995 | Takeda .................................. 422/186.07 |
| 5,683,576 | 11/1997 | Olsen ........................................ 210/138 |
| 5,785,864 | 7/1998 | Teran et al. .............................. 210/143 |
| 5,843,307 | 12/1998 | Faivre et al. ......................... 422/186.08 |
| 5,868,945 | 2/1999 | Morrow et al. .......................... 210/760 |
| 5,939,030 | 8/1999 | Moxley et al. ...................... 422/186.07 |

*Primary Examiner*—Thomas G. Wyse
*Attorney, Agent, or Firm*—Eugene Stephens & Associates

[57] ABSTRACT

A purifier treating a batch of liquid with ozone uses a reversible pump that directs liquid flow along different courses during forward and reverse pumping. In a forward mode, the pump directs ozonized liquid through a purification course that purifies the liquid; and in a reverse mode, the pump withdraws ozonized liquid from the purification course and redirects the withdrawn liquid to a reverse destination, which can be a purified liquid output or a return of the withdrawn liquid to a liquid container.

27 Claims, 5 Drawing Sheets

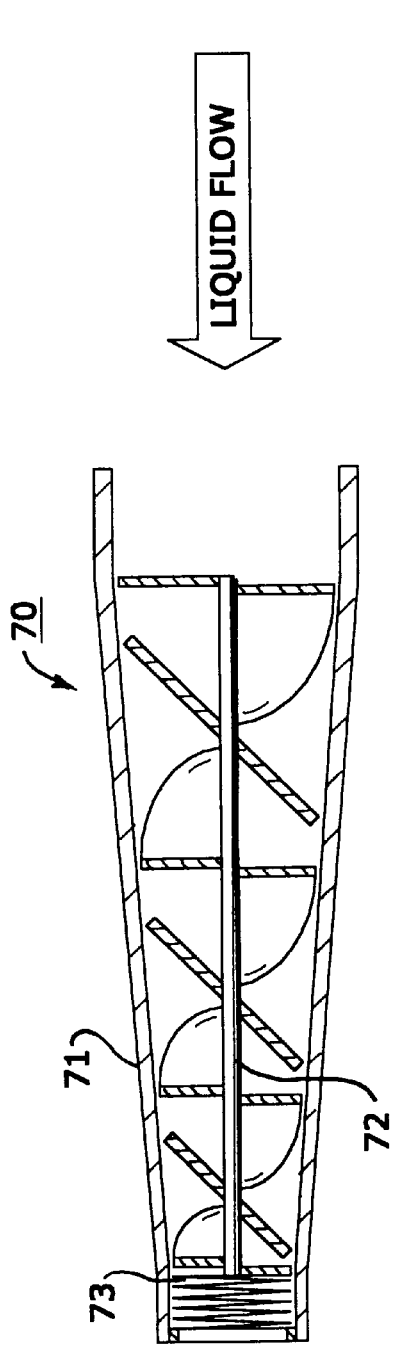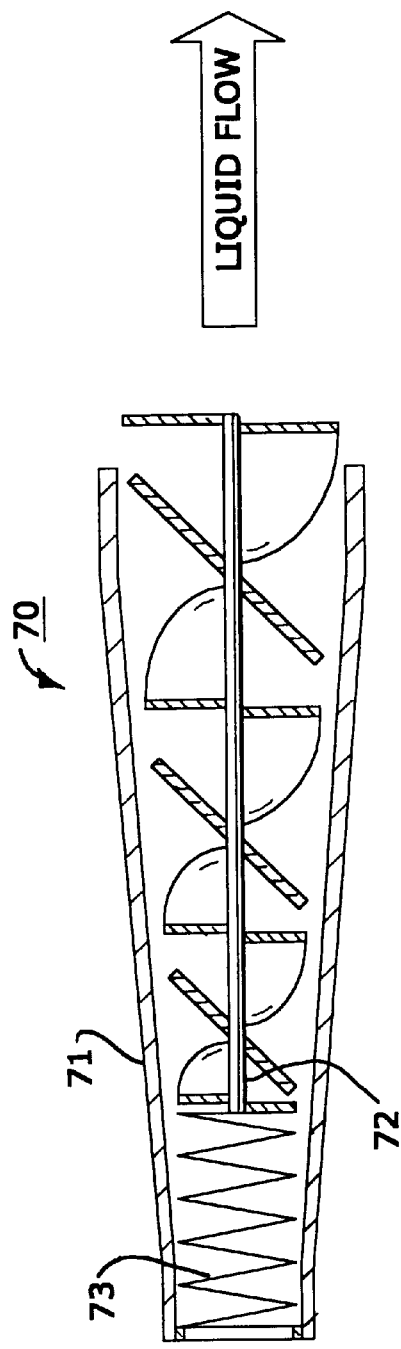

REVERSIBLE FLOW CIRCUIT FOR BATCH LIQUID PURIFIER

TECHNICAL FIELD

Ozone purification of small batches of liquid with countertop sized equipment.

BACKGROUND

This invention improves on batch liquid purifiers as disclosed in U.S. Pat. 5,207,993, entitled Batch Liquid Purifier, and copending Applications Ser. No. 09/004,903, filed Jan. 9, 1998, entitled Vented Batch Liquid Purifier, and No. 09/004,897, filed Jan. 9, 1998, entitled Flowthrough Batch Liquid Purifier, the disclosures of which are hereby incorporated by reference.

These purifiers treat a batch of liquid with ozone from an ozone generator to assure safe operation and dispensing of only purified liquid. Since these purifiers are intended to operate on a countertop, they must be compact and inexpensive, while meeting safety and reliability goals.

This invention involves recognition of alternate flow paths bringing attendant benefits to purifiers similar to the vented and flowthrough models of the copending applications. The invention also reduces the expense of components necessary in such purifiers, while contributing to safe and reliable operation.

SUMMARY OF THE INVENTION

The ozone purifiers of this invention use a reversible pump to produce flow alternatives accommodated by inexpensive check valve arrangements. Essentially, ozonized liquid is pumped in a forward direction through a purification course to purify the liquid; and then a control system reverses the pump so that ozonized liquid is withdrawn from the purification course and redirected to a reverse destination, which can be a purified liquid output or a container for unpurified liquid. When the reverse destination is a liquid output, the reversed pump dispenses purified liquid; and when the reverse destination is a liquid container, the reversed pump empties the purification course of liquid that might otherwise become contaminated after the purifier stops operating.

DRAWINGS

FIGS. 5 and 6 are schematic cross-sectional views of a movably biased in-line mixer intercepting forward flow as shown in FIG. 5 and partially bypassing reverse flow as shown in FIG. 6.

DETAILED DESCRIPTION

The purifier improvements of this invention center around use of a reversible flow pump 10. Making a pump reversible so that it can cause liquid to flow in opposite directions is relatively inexpensive and can be accomplished electrically by a purifier control system 15. Availability of reversible pump 10 then leads to recognition of alternate flow paths that can accomplish different purposes and benefits enhancing the operation of a purifier. The drawings illustrate several examples of the possible improvements that derive from a reversible pump.

Figure 1:
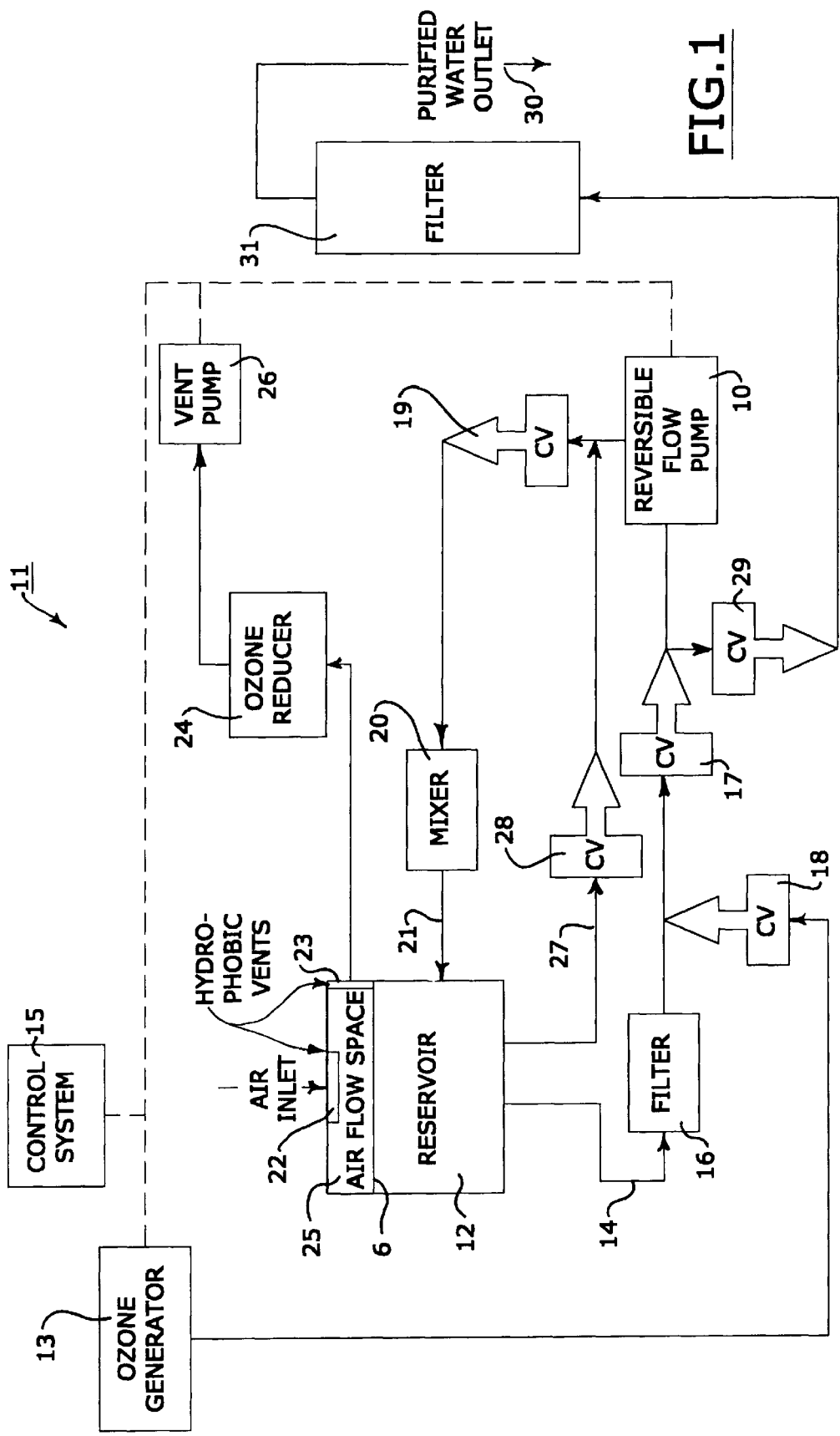
FIGS. 1 and 2 are schematic diagrams of two preferred embodiments of a reservoir form of purifier using a reversible pump according to the invention.

In the illustrative embodiment of a purifier 11 of FIG. 1, reversible pump 10 cooperates with a vented reservoir 12 and an ozone generator 13 to accomplish liquid purification. In a forward pumping mode under control of controller 15, liquid to be purified in reservoir 12 flows out from reservoir 12 through a line 14 that can include a filter 16 and does include a check valve 17 leading to pump 10. An ozone-containing gas from generator 13 is drawn through a check valve 18 into contact with liquid flowing toward pump 10. The liquid and gas are mixed together in pump 10 and outflow from pump 10 proceeds through a check valve 19 and a mixer 20, which can be an in-line mixer or other type of mixer. Pump 10 and mixer 20 each contribute to thorough contacting of the liquid with the ozone-containing gas, and the ozonized liquid is returned to reservoir 12 via a line 21. A liquid flow loop that includes reservoir 12, line 14, check valve 17, pump 10, check valve 19, and line 21 establishes a purification course through which ozonized liquid is directed by pump 10 for purifying the liquid. Control system 15 controls this circulation of liquid by elapsed time or by sensing a concentration of ozone dissolved in the liquid to complete the purification process.

Reservoir 12 is vented by inlet air, preferably through a porous, hydrophobic element 22, into a vent space 25 above a liquid surface 6 in reservoir 12. Gas from vent space 25 is exhausted, preferably through a porous, hydrophobic element 23 and an ozone reducer 24. A vent pump 26, operated by control system 15, preferably powers the venting of reservoir 12.

Venting reservoir 12 via vent pump 26 separates gas from ozonized liquid. Ozone reducer 24 ensures that separated gas does not include ozone vented to atmosphere. Separation of gas from the ozonized liquid also ensures that gas does not enter filter 16, where it could impair filter operation.

When pump 10 is reversed by control system 15, preferably after purifying liquid in reservoir 12, pump 10 withdraws ozonized liquid from the purification course and directs the withdrawn liquid to a reverse destination. This occurs in the embodiment of purifier 11 by flowing liquid out from reservoir 12 via a line 27 and a check valve 28 so that ozonized liquid enters pump 10 where ozonized liquid previously flowed outward from pump 10. A reverse outflow from pump 10 is blocked by check valve 17 but passed by a check valve 29 so that ozonized liquid flows toward a purified liquid dispensing outlet 30 serving as the reverse flow destination. A filter 31 is preferably arranged in the purified liquid outflow line.

Check valves 17–19, 28, and 29 are relatively inexpensive, as is reversing of pump 10, so that the illustrated arrangement of check valves and reversible pump 10 accomplishes two important functions within purifier 11. Pump 10 first powers circulating flow through the purification course that includes reservoir 12, and then the same pump 10 directs ozonized or purified liquid to a reverse destination 30 that dispenses purified liquid.

Figure 2:
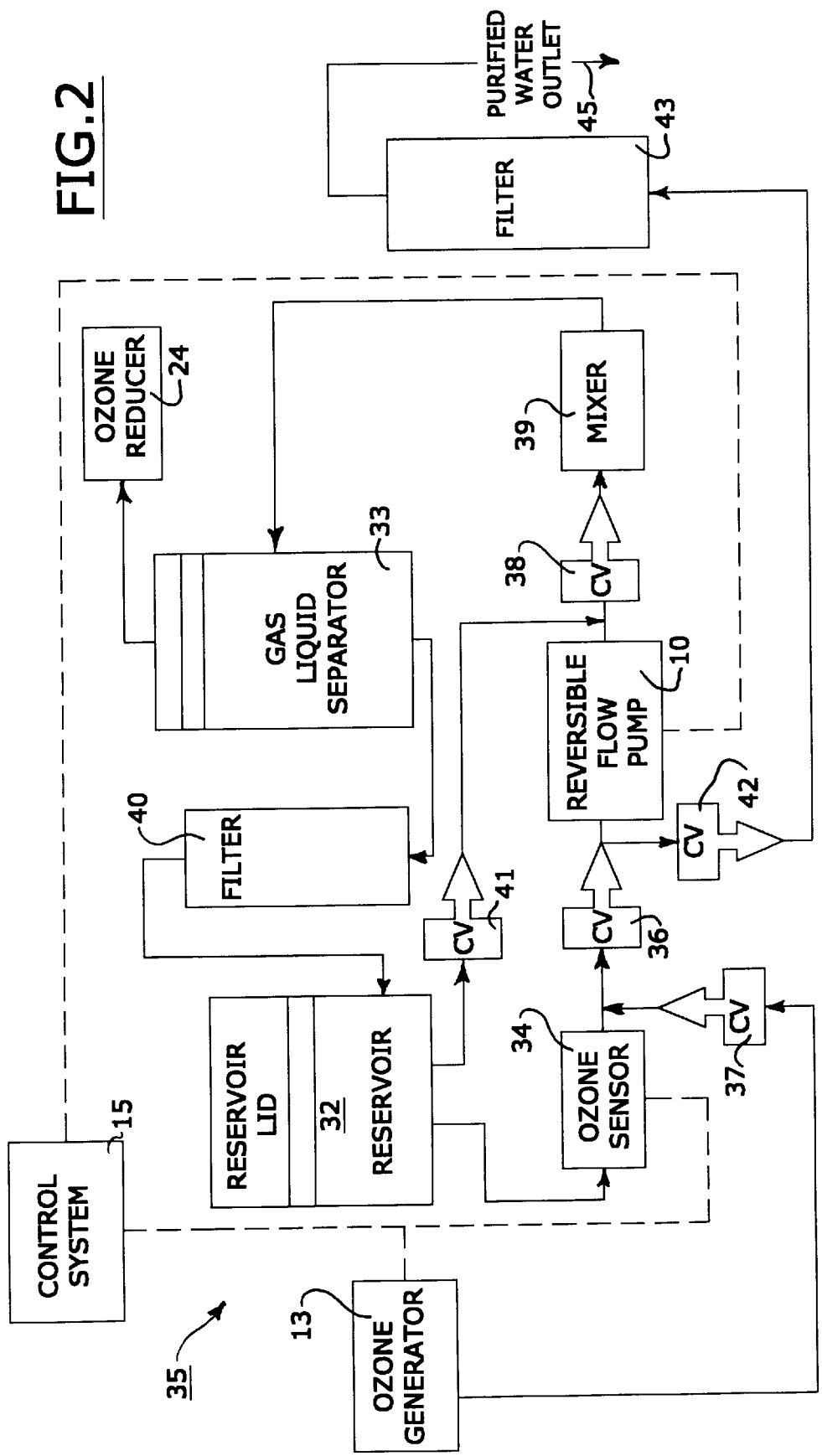

The arrangement of reversible pump 10 within a purifier embodiment 35 illustrated in FIG. 2 shows another advantageous possibility. A reservoir 32 of purifier 35 is not required to be vented, but instead a gas and liquid separator 33 is included in a circulation loop for a purification course extending from reservoir 32, through pump 10, and back to reservoir 32. The circulation loop illustrated for purifier 35 includes an ozone sensor 34 and a check valve 36 leading liquid toward pump 10 in its forward mode operation. An ozone-containing gas from generator 13 flows via a check valve 37 into merger with liquid flow upstream of check valve 36. The combined liquid and gas flows are mixed into contact by pump 10, which outflows through a check valve 38 and a mixer 39 to gas liquid separator 33 and then to a filter 40 and back to reservoir 32. Gas and liquid separator 33 prevents gas from entering filter 40; and mixer 39, which can be an in-line mixer, contributes to the mixing and contacting of the liquid with the ozone-containing gas for purification purposes.

When pump 10 is reversed by control system 15, ozonized liquid from the purification course is blocked from one path by check valve 38, but flows in another path to enter pump 10 via a check valve 41 from reservoir 32 and proceed toward a reverse destination. Check valve 36 blocks flow back toward reservoir 32, but a check valve 42 allows reverse flow to proceed through a filter 43 to a purified liquid dispenser 45. Again, an inexpensive arrangement of a reversible flow pump in cooperation with an array of check valves accomplishes both flow through a purification course and output dispensing flow of purified liquid.

Figure 3:
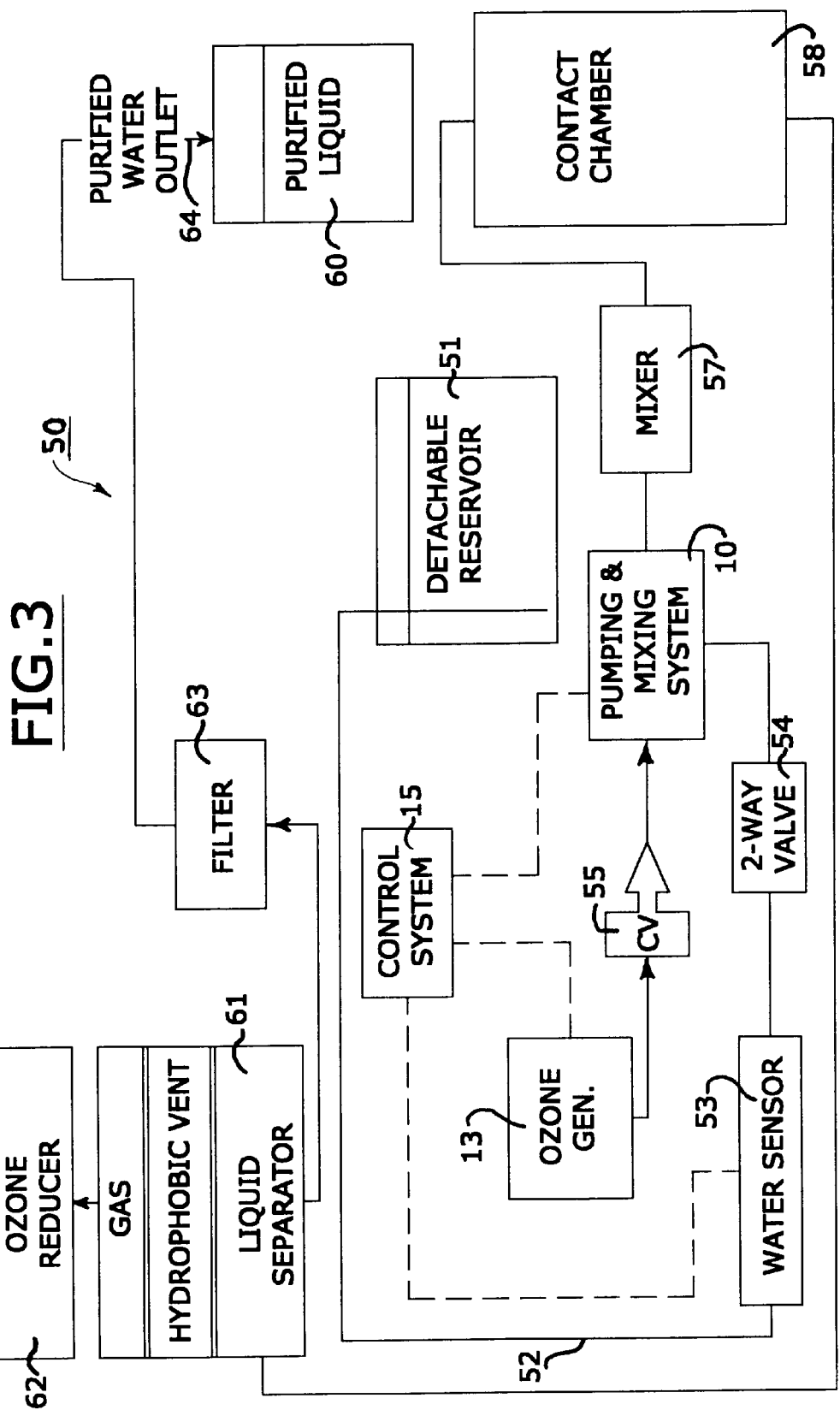
FIG. 3 is a schematic diagram of a preferred embodiment of a flowthrough purifier using a reversible pump according to the invention.

An embodiment of a flowthrough-type purifier 50, illustrated in FIG. 3, places reversible pump 10 in cooperation with a preferably detachable reservoir 51, control system 15, and ozone generator 13. Liquid to be purified flows from reservoir 51 via a line 52 and to a forward flow inlet of pump 10 via a water sensor 53 and a two-way valve 54. An ozone-containing gas also enters pump 10 from ozone generator 13 via a check valve 55. Valve 54 provides some flow resistance that can be overcome by pump 10, but otherwise allows flow in both directions. Valve 54 can then prevent siphoning or draining of liquid from reservoir 51 into pump 10 when pump 10 is not operating.

In a forward pumping mode, an outflow from pump 10 passes through a mixer 57 and through a contact chamber 58 that allows time for ozonized liquid to become purified. A purification course from pump 10 through contact chamber 58 proceeds toward a purified liquid container 60. Along the way, ozonized liquid preferably passes through a gas-liquid separator 61, which vents gas via an ozone reducer 62, and a filter 63 upstream of a purified liquid outlet 64.

By the time ozonized liquid reaches outlet 64, it is purified and ready for consumption from container 60. Upstream of outlet 64, however, ozonized liquid in contact chamber 58 or in mixer 57 may be insufficiently contacted with ozone to be purified.

When control system 15 reverses pump 10, preferably after purifying and dispensing some liquid, pump 10 withdraws ozonized liquid from the purification course that includes contact chamber 58 and mixer 57 and directs the withdrawn liquid to a reverse destination. This reverses the flow from the purification course back through valve 54 and back to reservoir 51. Such reverse flow drains the purification course of ozonized liquid and sends it back toward reservoir 51, where it can be either discarded or purified later in a subsequent purification cycle. Withdrawal of incompletely purified liquid from the purification course during reverse flow of pump 10 avoids the problem of liquid becoming contaminated while standing in the purification course. This happens because liquid withdrawn from the purification course downstream of pump 10 during its forward operating mode is returned to a position proceeding pump 10 on any subsequent purification cycle. Any such withdrawn liquid is recontacted with ozone gas upon reentering pump 10 in a forward pumping mode whenever purifier 50 is restarted.

Figure 4:
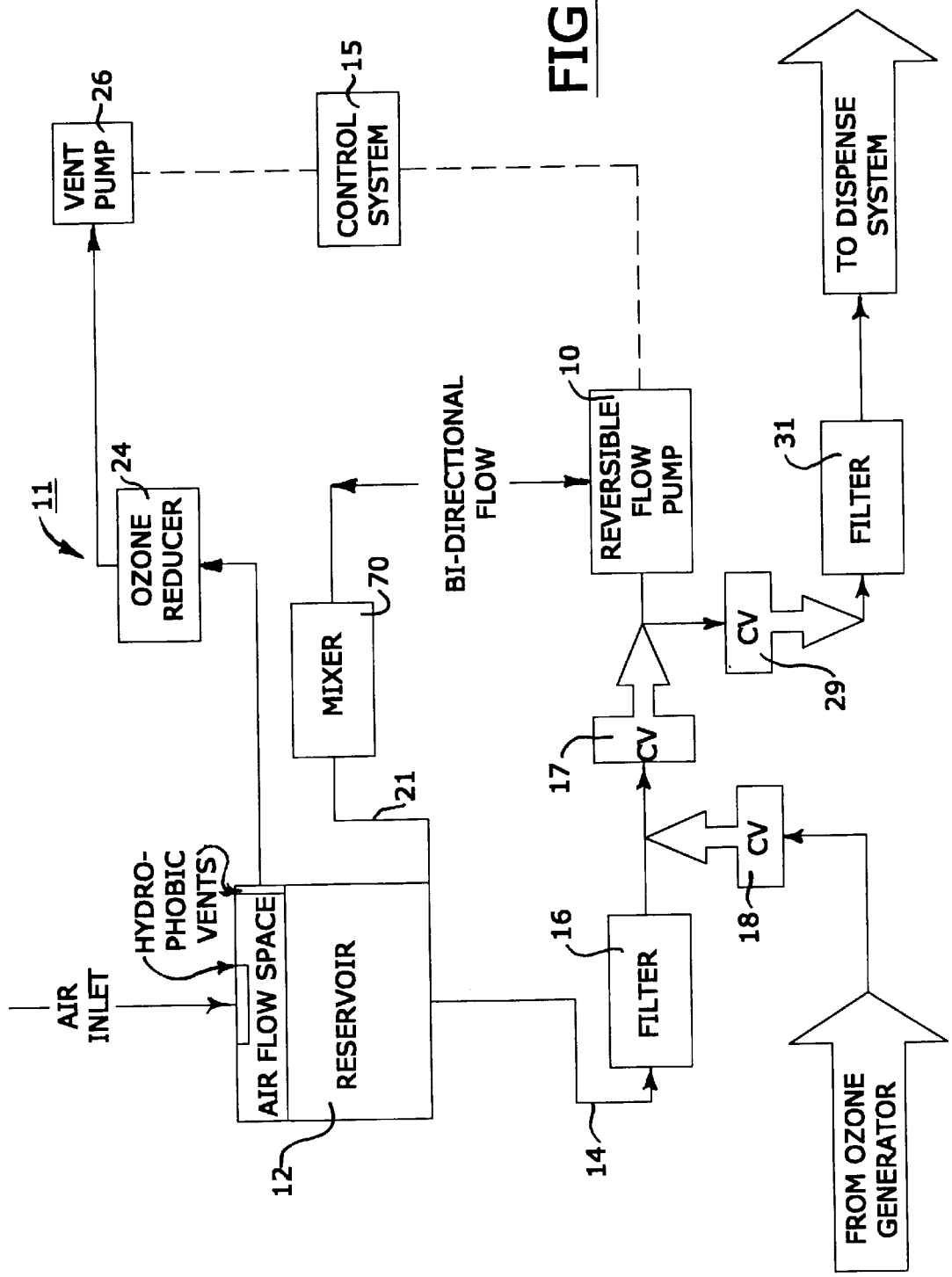
FIG. 4 is a schematic diagram of a preferred alternative to the embodiment of FIG. 1.

An alternate form of a forward and reverse circuit for purifier 11 is shown in FIG. 4. The circulation loop drawing liquid from reservoir 12 via line 14 and returning ozonized liquid to reservoir 12 via line 21 includes an in-line mixer 70 that is especially configured to accommodate reverse flow. When pump 10 is reversed, reverse flow occurs through mixer 70 to pump 10 and from pump 10 through filter 31 and on to a dispensing system. This eliminates line 27 and check valve 28 from the arrangement of FIG. 1. The embodiment of FIG. 4 can also operate with mixer 70 that is externally powered or otherwise configured to accommodate flow in either direction.

A preferred form of static-type mixer 70 is schematically shown in FIGS. 5 and 6. Within a conic or otherwise tapered conduit 71 is an in-line mixer element 72 that is biased by a spring 73. Liquid flowing in a forward direction and meeting the resistance of mixing element 72 pushes element 72 leftward into contact with interior walls of conduit 71, while compressing spring 73. This forces forward flowing liquid through mixing element 72 for mixing purposes, as shown in FIG. 5.

Upon reverse liquid flow, as shown in FIG. 6, liquid force, combined with the force of spring 73, moves mixing element 72 rightward so that it becomes loose within conduit 71. This allows reverse flowing liquid to pass both through and around mixing element 72, which thus accommodates at least partial bypass of reverse flow, while intercepting and mixing forward flow. A biased and positionally variable mixing element 70 can also be used for mixing element 57 in the flowthrough purifier embodiment 50 of FIG. 3.

We claim:

1. A purifier treating a batch of liquid with ozone, the purifier combining an ozone generator producing an ozone-containing gas, a controller, a pump, and a purification course, and the purifier comprising:

a. the pump being reversed in response to the controller after the pump has caused mixing of the ozone-containing gas into contact with the liquid and has directed ozonized liquid through the purification course; and b. the pump withdrawing ozonized liquid from the purification course during reverse operation and redirecting the withdrawn ozonized liquid to a reverse destination.

2. The purifier of claim 1 wherein the reverse destination is a purified liquid output from the purifier.

3. The purifier of claim 1 wherein the reverse destination is a container for unpurified liquid.

4. The purifier of claim 3 wherein purified liquid is dispensed from the purification course before reverse operation of the pump occurs.

5. The purifier of claim 1 wherein the purification course includes a static mixer, and ozonized liquid withdrawn from the purification course at least partially bypasses the static mixer.

6. The purifier of claim 5 wherein the static mixer is movably biased within the purification course to require liquid flow through the static mixer in a forward direction and to allow liquid flow around the static mixer in a reverse direction.

7. The purifier of claim 1 wherein a filter is arranged between the pump and the reverse destination.

8. The purifier of claim 1 including check valves arranged to direct liquid flow through the purification course during forward operation of the pump and to direct liquid flow to the reverse destination during reverse operation of the pump.

9. A method of operating an ozone purifier that purifies a batch of liquid, the method using a purifier having an ozone generator producing an ozone-containing gas and a pumping system for contacting the liquid with the ozone-containing gas and directing ozonized liquid through a purification course, the method comprising:

after operating the purifier and the pumping system in a forward mode to direct ozonized liquid through the purification course, then reversing a pump in the pumping system to withdraw ozonized liquid from the purification course and redirect the withdrawn ozonized liquid to a reverse destination.

10. The method of claim 9 including making the reverse destination a container for untreated liquid.

11. The method of claim 9 including making the reverse destination a purified liquid dispensing outlet from the purifier.

12. The method of claim 11 including filtering the ozonized liquid upstream of the dispensing outlet.

13. The method of claim 9 including partially bypassing a static mixer in the purification course as ozonized liquid is withdrawn from the purification course.

14. The method of claim 9 including substantially emptying the purification course during reverse pumping.

15. The method of claim 9 wherein the purification course includes a reservoir holding the liquid batch, and including withdrawing ozonized liquid from the reservoir during reverse pumping.

16. The method of claim 9 including check valves to direct liquid flow to the purification course and to the reverse destination.

17. In an ozone purifier having an ozone generator producing an ozone-containing gas and a pump that causes the ozone-containing gas to combine with a liquid to be treated and directs ozonized liquid through a purification course, the improvement comprising:

a. the pump being reversed by a controller of the purifier after the purifier has directed ozonized liquid through the purification course;

b. reverse operation of the pump being arranged for withdrawing ozonized liquid from the purification course; and c. the ozonized liquid withdrawn from the purification course being directed to a reverse destination.

18. The improvement of claim 17 wherein the reverse destination is a purified liquid dispensing outlet from the purifier.

19. The improvement of claim 18 wherein the purification course includes a reservoir for the liquid batch.

20. The improvement of claim 19 wherein ozonized liquid is withdrawn from the reservoir during reverse operation of the pump.

21. The improvement of claim 17 wherein the reverse destination is an untreated liquid container.

22. The improvement of claim 21 wherein a small portion of the ozonized liquid is directed to the untreated liquid container.

23. The improvement of claim 21 wherein the purification course is substantially emptied of withdrawn ozonized liquid.

24. The improvement of claim 17 wherein the purification course includes a static mixer that is at least partially bypassed during reverse operation of the pump.

25. The improvement of claim 24 wherein the static mixer is movably biased within the purification course to intercept forward flow and partially bypass reverse flow.

26. The improvement of claim 17 wherein a filter is arranged upstream of the reverse destination.

27. The improvement of claim 17 wherein an arrangement for directing liquid flow downstream of the pump includes an array of check valves.

* * * * *